(12) United States Patent
Picard et al.

(10) Patent No.: US 12,258,290 B2
(45) Date of Patent: Mar. 25, 2025

(54) METHOD OF LOCALIZED CONSOLIDATION OF PARTS ASSEMBLED BY MOLECULAR ADHESION

(71) Applicant: SAFRAN ELECTRONICS & DEFENSE, Paris (FR)

(72) Inventors: Mathieu Picard, Moissy-Cramayel (FR); Bruno Letourneur, Moissy-Cramayel (FR); Bastien Henault, Moissy-Cramayel (FR); Alice Garnier, Moissy-Cramayel (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 145 days.

(21) Appl. No.: 17/994,164

(22) Filed: Nov. 25, 2022

(65) Prior Publication Data

US 2023/0159386 A1 May 25, 2023

(30) Foreign Application Priority Data

Nov. 25, 2021 (FR) ........................................ 2112485

(51) Int. Cl.
*C03C 27/06* (2006.01)
*H01S 3/081* (2006.01)
(Continued)

(52) U.S. Cl.
CPC ............ *C03C 27/06* (2013.01); *H01S 3/0816* (2013.01); *H01S 3/083* (2013.01); *H01S 3/0602* (2013.01)

(58) Field of Classification Search
CPC ......... C03C 27/06; C03B 23/20; B23K 26/20; G01C 19/64; G01C 19/66
(Continued)

(56) References Cited

U.S. PATENT DOCUMENTS

2008/0041920 A1* 2/2008 Kirchhof ................ B23K 26/28
228/101
2013/0126938 A1* 5/2013 Eberhardt .......... B23K 26/0676
438/26
(Continued)

FOREIGN PATENT DOCUMENTS

WO WO8910539 A1 11/1989

OTHER PUBLICATIONS

Cui, W., et al., "English machine-translation by Clarivate Analytics of CN-105978525-B, with full foreign patent attached", H03H9/13, Sep. 25, 2018. (Year: 2018).*
(Continued)

*Primary Examiner* — S. Behrooz Ghorishi
*Assistant Examiner* — Gregory C. Grosso
(74) *Attorney, Agent, or Firm* — MUNCY, GEISSLER, OLDS & LOWE, P.C.

(57) ABSTRACT

A method of assembling together a first part and at least one second part that are made of materials compatible with bonding by molecular adhesion includes a step of pressing a first surface of the first part against a second surface of the second part so as to create molecular bonds at an interface between the parts, and a step of consolidating the interface bonding as created in this way by heat treatment. The consolidation includes a step of emitting a power laser beam towards an impact point forming a portion of the outline of the interface, and a step of moving the impact point along the outline of the interface.

7 Claims, 1 Drawing Sheet

(51) Int. Cl.
*H01S 3/083* (2006.01)
*H01S 3/06* (2006.01)

(58) Field of Classification Search
USPC .................................................... 156/272.8
See application file for complete search history.

(56) References Cited

U.S. PATENT DOCUMENTS

| | | |
|---|---|---|
| 2015/0250386 A1 | 9/2015 | Jose James |
| 2015/0298256 A1 | 10/2015 | Maattanen |
| 2021/0078104 A1 | 3/2021 | Maattanen et al. |

OTHER PUBLICATIONS

De Salaberry, B., "English machine-translation by Clarivate Analytics of FR-2630551-A1, with full foreign patent attached", G01C19/665, Oct. 27, 1989. (Year: 1989).*

Cui, W., et al., "English machine-translation by Clarivate Analytics of CN-105978525-B, with full foreign patent attached", H03H9/13, Sep. 25, 2018. (See the NPL document filed on Jun. 18, 2024). (Year: 2018).*

De Salaberry, B., "English machine-translation by Clarivate Analytics of FR-2630551-A1, with full foreign patent attached", G01C19/665, Oct. 27, 1989. (See the NPL document filed on Jun. 18, 2024). (Year: 1989).*

\* cited by examiner

METHOD OF LOCALIZED CONSOLIDATION OF PARTS ASSEMBLED BY MOLECULAR ADHESION

The present invention relates to the field of assembling parts by molecular adhesion, in particular for fabricating ring laser gyroscopes.

BACKGROUND OF THE INVENTION

A ring laser gyroscope comprises a single-piece main body, generally made out of a glass-ceramic (such as that sold under the trademark Zerodur by the supplier Schott AG) and including a cavity defining an optical path that is triangular or square. At the corners of the optical path, the main body includes openings, each closed by a respective mirror, generally made in a block of the same material as the main body, but provided with a surface that is treated in part in order to be reflective. The main body also has two bores, each having a respective electrode bonded therein in order to constitute a laser emitter. The sealed cavity is filled with a gas mixture selected to constitute an amplifying medium for the laser.

Since electrodes are made out of a metal having a coefficient of thermal expansion that is much greater than that of the main body, the electrodes are generally bonded by means of a crushed indium gasket that serves to absorb this difference between the coefficients of thermal expansion (such method is a cold bonding method currently named "soudure à froid" in French).

The main difficulty is thus assembling the mirrors, which must be done under conditions that are adapted to avoid damaging the bonding of the electrodes. The assembly needs to guarantee that the cavity is hermetically sealed, limiting any possibility of leakage to $10^{-12}$ pascal-liters per second ($Pa \cdot L \cdot s^{-1}$) over more than 1000 hours (h) at 80° C. with relative humidity of 100%.

The mirrors are bonded by molecular adhesion (or "direct bonding", i.e. without using adhesive), which consists in pressing together two parts (made of materials that are compatible with this bonding technique) in such a manner that molecular bonds (van der Waals forces, hydrogen bonds, and/or covalent bonds) are created between the parts. The strength of such bonding is determined by the quality of the contact between the two surfaces. The quality of the contact depends directly on: the flatness of the contacting surfaces, very low roughness of the contacting surfaces, and the cleanliness of the contacting surfaces. Prior treatment of the surfaces (in particular polishing) serves to prepare the surfaces that are to be put into contact so as to impart an appropriate surface state to said surfaces. The surfaces are pressed against each other under conditions of temperature and pressure and for a duration that are determined so as to enhance the creation of molecular bonds. Once the bond has been created, it is generally necessary to consolidate the bonding of the parts by placing them in an oven at a temperature higher than 700° C. Clearly, that method cannot be used in association with bonded parts including materials having a melting temperature that is lower, such as indium, which melts at 157° C. Also, consolidation needs to be done after the cavity has been filled with the gas mixture, and without contaminating it.

OBJECT OF THE INVENTION

A particular object of the invention is to provide means for reinforcing parts such as the main body and the mirrors of a ring laser gyroscope.

SUMMARY OF THE INVENTION

To this end, according invention, there is provided a method of assembling of a gyrolaser having a main body including a cavity, the method comprising:
pressing a first surface of a mirror against a second surface surrounding an opening of the main body so as to create molecular bonds at an interface between the mirror and the main body to fix them one to the other by molecular adhesion, the main body and the mirror being made of materials that are compatible with bonding by molecular adhesion, and
consolidating by heat treatment the interface bonding as created in this way, the consolidation comprising emitting a power laser beam towards an impact point forming a portion of the outline of the interface, and moving the impact point along the whole outline of the interface, the consolidation being realized after at least one electrode has been cold bonded onto the main body.

Thus, it is possible to perform consolidation by heating that is very localized and to keep control over the overall heating of the parts that results therefrom. When applied to fabricating a ring laser gyroscope, the mirrors may be bonded to the main body without any risk of deteriorating the indium gaskets used for bonding the electrodes. Naturally the method of invention can be used for making assemblies in which the integrity of at least one of the parts being assembled together could be endangered by being heated excessively.

Other characteristics and advantages of the invention appear on reading the following description of a particular and nonlimiting implementation of the invention.

BRIEF DESCRIPTION OF THE DRAWING

Reference is made to the accompanying drawing, in which.

DETAILED DESCRIPTION OF THE INVENTION

Figure 1:
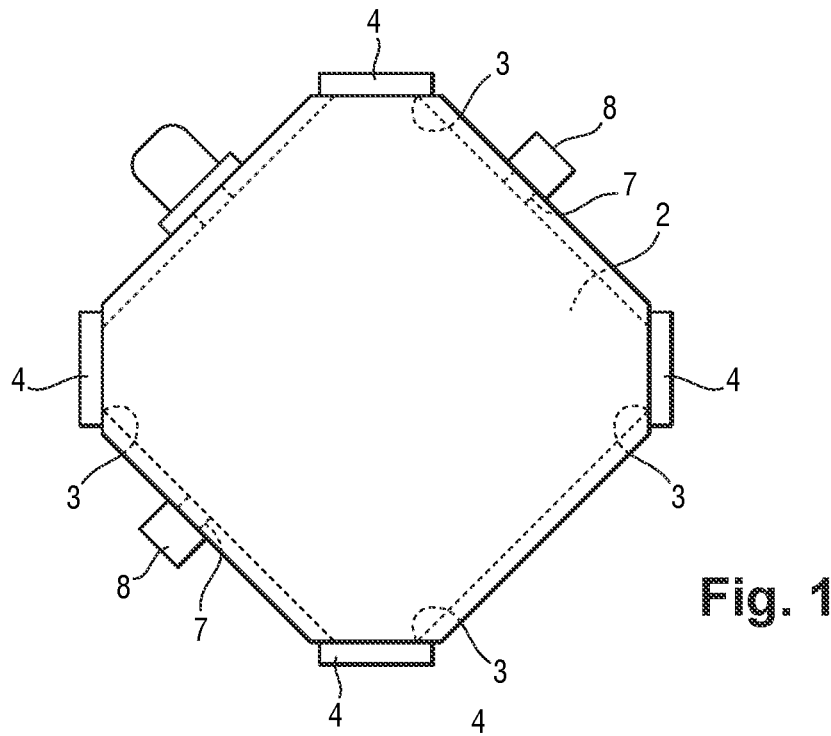
FIG. 1 is a diagrammatic view of a ring laser gyroscope fabricated in accordance with the invention.
Figure 2:
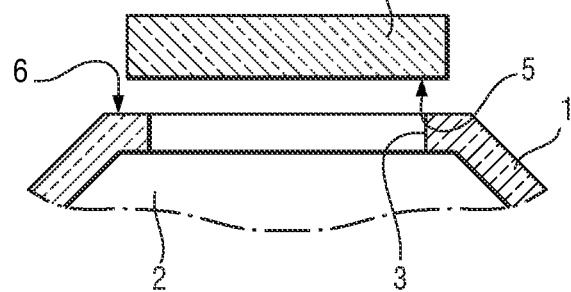
FIG. 2 is a fragmentary diagrammatic view in section on a midplane showing the ring laser gyroscope immediately before one of the mirrors is put into place.
Figure 3:
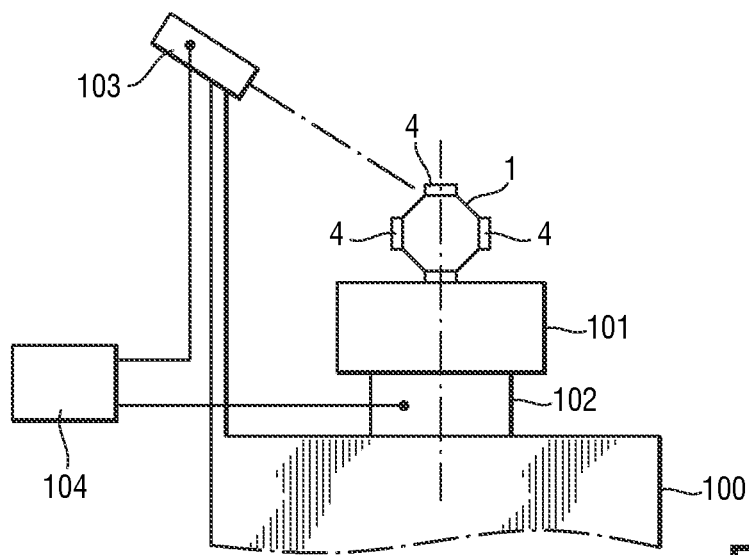
FIG. 3 is a diagrammatic view of a machine suitable for performing the method of the invention.

With reference to FIGS. 1 and 2, the ring laser gyroscope comprises a single-piece main body, given overall reference 1, and in which there is a cavity 2 defining an optical path, a square path in this example, with the main body 1 having openings 3, circular openings in this example, that are formed at the corners of the path. In this example, the main body 1 is made of a glass-ceramic (such as that sold under the trademark Zerodur by the supplier Schott AG).

Each of the openings 3 is closed by a respective mirror 4. In this example, each mirror 4 is formed by a cylindrical block of diameter greater than the diameter of the opening 3 that it closes, such that each mirror 4 has a peripheral surface 5 of annular shape that is pressed against an annular surface 6 of the main body 1 bordering the opening 3. In this example, each mirror 4 is made out of the same material as the main body 1, but it is provided with a surface that has been treated in known manner so as to be reflective.

The main body 1 also has two through holes 7, each having an electrode 8 bonded therein in order to constitute the laser emitter. The electrodes 8 are made of a metal having a coefficient of thermal expansion that is much greater than that of the main body 1. In this example, the electrodes 8 are bonded in conventional manner by respective crushed indium gaskets that serve to absorb this difference in coefficients of thermal expansion.

The cavity 2 is filled with a gas mixture selected to constitute an amplifying medium for the laser. Filling is performed by means of a glass tube ("queusot" in French), not shown in figures, that is bonded to the main body 1 so as to open out into the cavity 2.

The structure and the operation of a ring laser gyroscope are themselves known and are not described in greater detail herein.

Assembly of the ring laser gyroscope consists initially in bonding the electrodes 8 and the glass tube.

The electrodes 8 and the glass tube are bonded in conventional manner. The method continues by bonding the mirrors 4 by performing the molecular adhesion method. The peripheral surface 5 of each member 4 is pressed against the annular surface 6 of the corresponding opening 3 in such a manner as to cause molecular bonds to be created between those surfaces at the interface between the mirror 4 and the main body 1. In the method of the invention, in order to obtain molecular adhesion, the peripheral surfaces 5 are pressed against the annular surfaces 6 under conditions of temperature, duration, and pressure that are the same as in the conventional method. Likewise, the peripheral surfaces 5 and the annular surfaces 6 are prepared beforehand as in the conventional molecular adhesion method.

Once the electrodes 8, the glass tube, and the mirrors 4 had been bonded together, the cavity 2 is filled by introducing the gas mixture via the tube prior to closing it in conventional manner.

In the method of invention, the consolidation step is then performed in a manner that is different from that of the conventional method.

To do this, use is made of a machine that comprises a stand 100 on which there is mounted a turntable 101 that pivots about a vertical axis and that is to support the main body 1. The turntable 101 is provided with a rotary drive motor 102, and for this purpose it includes tooling for holding the main body 1 temporarily in position. A laser emitter 103 is bonded on the stand 100 in such a manner that the laser emitter 103 emits a power laser beam towards an impact point forming a portion of the outline of the interface (i.e. the junction zone) between the main body 1 and the mirror 4 that is being bonded. By pivoting the turntable 101 about its axis of rotation, the impact point is moved along the outline of the interface until the entire outline of the interface has been impacted by the laser beam. It may be necessary to perform a plurality of revolutions in order to obtain consolidation that is sufficient (by way of example, the number of revolutions needed is determined by modelling or else experimentally by leak testing at high temperature and high humidity). The motor 102 and the laser emitter 103 are connected to an electronic control unit 104 for controlling actuation of the motor 102 and actuation of the laser emitter 103 so as to heat the entire outline of the interface. Specifically, the electronic control unit 104 causes the turntable 101 to start rotating before causing the laser beam to be emitted.

In this example, the laser emitter 103 is of YAG type. The laser beam has a wavelength of 1064 nanometers (nm) and the laser emitter 102 is operated so that it delivers pulses, each having a duration of 20 nanoseconds (ns) and energy of 260 millijoules (mJ). The energy of the pulses and their repetition rate are determined in such a manner that the impacts of the pulses serve to create covalent bonds at the interface between the parts, but without causing material to melt.

Preferably, the laser emitter 103 is adjustable in position and in orientation relative to the stand 100.

Also preferably, the stand 100 has a removable protective cover that is not shown herein.

Naturally, the invention is not limited to the implementation described, but covers any variant coming within the ambit of the invention as defined by the claims.

In particular, the method can be used for bonding parts made of glass-ceramic, of glass, of sapphire, of quartz, or of metal: i.e. out of any material that is compatible with bonding by molecular adhesion.

The machine use need not include a turntable, the laser emitter could be attached to a rotary support that turns around the main body 1.

Other types of laser could be used, providing their properties (in particular in terms of power) are suitable for heating the interface between the parts sufficiently to consolidate the molecular adhesion.

In a particular application for bonding a mirror, forming the first part, on a surface, forming the second surface bordering the last free opening of a ring laser gyroscope main body forming the second part and including a cavity, consolidation may be performed after the cavity has been filled with a gas mixture.

The invention is applicable to assembling a variety of parts, and is not intended solely for fabricating ring laser gyroscopes.

The invention claimed is:

1. A method of assembling of a gyrolaser having a main body including a cavity, the method comprising:
   pressing a first surface of a mirror against a second surface bordering an opening of the main body so as to create molecular bonds at an interface between the mirror and the main body to fix them one to the other by molecular adhesion, the main body and the mirror being made of materials that are compatible with bonding by molecular adhesion, and
   heating the interface to consolidate the molecular bonds created at the interface, consolidation comprising emitting a power laser beam towards an impact point forming a portion of an outline of the interface, and moving the impact point along the whole outline of the interface, consolidation being performed after at least one electrode has been cold bonded onto the main body.

2. The method according to claim 1, wherein the laser beam has a wavelength of 1064 nm and is operated so that it delivers pulses, each having a duration of 20 ns and energy of 260 mJ.

3. The method according to claim 1, wherein the main body and the mirror are made of glass-ceramic, of glass, of sapphire, or of quartz.

4. The method according to claim 1, wherein the impact point is moved in such a manner as to perform a plurality of passes along the outline.

5. The method according to claim 1, wherein consolidation is performed after the cavity has been filled with a gas mixture.

6. The method according to claim 1, wherein consolidation is performed by means of a laser emitter adjustable in position and orientation in relation to a stand on which is mounted a turntable supporting the main body.

7. A method of assembling of a gyrolaser having a main body including a cavity, the method comprising:

pressing a first surface of a mirror against a second surface bordering an opening of the main body so as to create molecular bonds at an interface between the mirror and the main body to fix them one to the other by molecular adhesion, the main body and the mirror being made of materials that are compatible with bonding by molecular adhesion, and after at least one electrode has been cold bonded onto the main body, heating the interface to consolidate the molecular bonds created at the interface, consolidation comprising emitting a power laser beam towards an impact point forming a portion of an outline of the interface, and moving the impact point along the whole outline of the interface, said power laser beam being produced by a laser emitter operated so that it delivers pulses having energy and repetition rate determined in such a manner that impacts of the pulses serve to create covalent bonds at the interface between the parts, but without causing the materials of the main body and the mirror to melt.

* * * * *